United States Patent
Peeters Weem

(10) Patent No.: US 8,607,504 B2
(45) Date of Patent: Dec. 17, 2013

(54) STATOR ELEMENT AND SLIDING DOOR PROVIDED THEREWITH, AND A METHOD FOR DISPLACING AN ELEMENT SUCH AS A DOOR

(75) Inventor: Petrus Johannes Maria Peeters Weem, Hertogenbosch (NL)

(73) Assignee: Kone Corporation, Helsinki (FI)

( * ) Notice: Subject to any disclaimer, the term of this patent is extended or adjusted under 35 U.S.C. 154(b) by 143 days.

(21) Appl. No.: 12/736,146

(22) PCT Filed: Apr. 9, 2009

(86) PCT No.: PCT/NL2009/000089
§ 371 (c)(1),
(2), (4) Date: Feb. 18, 2011

(87) PCT Pub. No.: WO2009/126026
PCT Pub. Date: Oct. 15, 2009

(65) Prior Publication Data
US 2011/0138691 A1  Jun. 16, 2011

(30) Foreign Application Priority Data

Apr. 9, 2008  (NL) .................................... 1035273

(51) Int. Cl.
*E05F 11/00*  (2006.01)
(52) U.S. Cl.
USPC .......... 49/360; 49/324; 310/12.24; 310/12.27
(58) Field of Classification Search
USPC ......... 49/360, 409, 323, 324, 404; 310/12.09, 310/12.31, 12.24, 12.27; 104/281, 287, 104/288, 290
See application file for complete search history.

(56) References Cited

U.S. PATENT DOCUMENTS

| | | | | |
|---|---|---|---|---|
| 4,288,709 A | * | 9/1981 | Matthias et al. | 310/49.23 |
| 4,665,329 A | * | 5/1987 | Raschbichler | 310/13 |
| 5,208,503 A | * | 5/1993 | Hisey | 310/216.054 |
| 5,712,516 A | * | 1/1998 | Kabout | 310/12.04 |
| 5,889,340 A | * | 3/1999 | Miller et al. | 310/12.01 |

(Continued)

FOREIGN PATENT DOCUMENTS

| | | |
|---|---|---|
| DE | 10 2004 050 313 | 4/2006 |
| DE | 10 2005 002 038 | 7/2006 |
| EP | 1 705 326 | 9/2006 |
| NL | 9202053 | 6/1994 |

OTHER PUBLICATIONS

International Search Report.

*Primary Examiner* — Katherine Mitchell
*Assistant Examiner* — Shiref Mekhaeil
(74) *Attorney, Agent, or Firm* — Harness, Dickey & Pierce, PLC

(57) ABSTRACT

A stator element is disclosed for an electrical driving of a slidable body, such as a sliding door. Such a sliding door and a method for displacing thereof are also disclosed. In at least one embodiment, he stator element includes an elongate holder; a number of carrier elements arranged adjacently of each other and connected to the holder, wherein the carrier element includes a number of plate-like strips; and at least one winding arranged round each carrier element, wherein during use the winding is connected to a voltage source for the purpose of generating an electromagnetic field which during use is operatively connected to at least one counter-element in the form of a magnet or magnetizable element provided on the slidable body.

15 Claims, 3 Drawing Sheets

(56) References Cited

U.S. PATENT DOCUMENTS

| | | | |
|---|---|---|---|
| 6,317,962 B1* | 11/2001 | Adachi et al. | 29/596 |
| 6,664,703 B2* | 12/2003 | Oketani et al. | 310/216.004 |
| 6,753,666 B2* | 6/2004 | Fischperer | 318/135 |
| 6,777,850 B2* | 8/2004 | Harada et al. | 310/254.1 |
| 6,789,305 B2* | 9/2004 | Seki et al. | 29/596 |
| 6,885,127 B1* | 4/2005 | Higashino et al. | 310/254.1 |
| 6,892,439 B1* | 5/2005 | Neal et al. | 29/596 |
| 7,078,842 B2* | 7/2006 | Hoppe et al. | 310/182 |
| 7,211,924 B2* | 5/2007 | Furusho et al. | 310/309 |
| 7,282,830 B2* | 10/2007 | Harrer et al. | 310/216.111 |
| 7,459,826 B2* | 12/2008 | Lee | 310/216.044 |
| 7,728,481 B2* | 6/2010 | Lee | 310/216.041 |
| 7,960,890 B2* | 6/2011 | Miyake et al. | 310/216.058 |
| 8,109,040 B2* | 2/2012 | Finke | 49/360 |
| 8,113,263 B2* | 2/2012 | Reed et al. | 160/188 |
| 2002/0079780 A1* | 6/2002 | Muszynski | 310/218 |

* cited by examiner

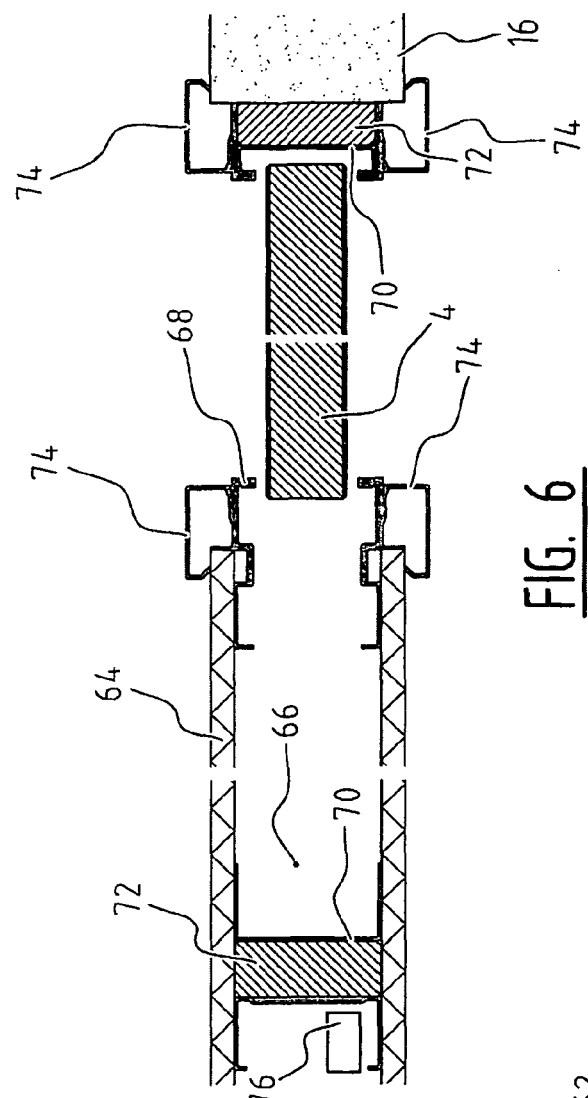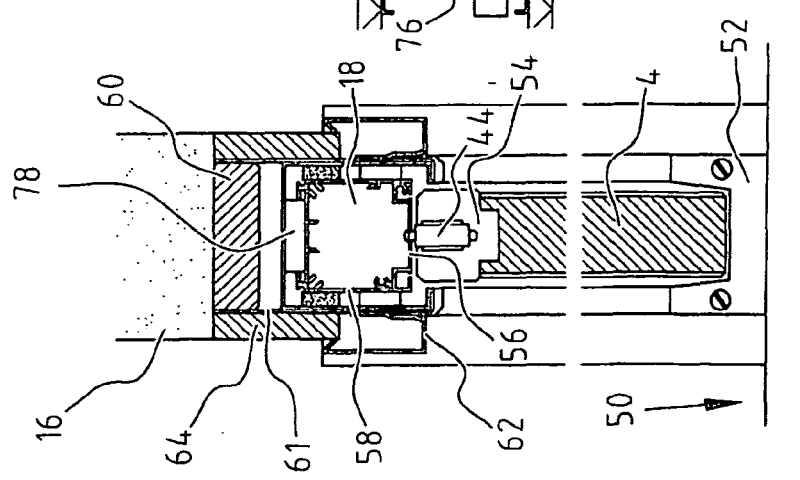
FIG. 6
FIG. 5

STATOR ELEMENT AND SLIDING DOOR PROVIDED THEREWITH, AND A METHOD FOR DISPLACING AN ELEMENT SUCH AS A DOOR

The present invention relates to a stator element for an electrical driving of a slidable body such as a door, gate or carriage. The body is here reciprocally slidable over a limited length along a straight or curved line.

A known sliding door assembly provided with a stator element is described in NL 9202053. Described herein is a stator element for linear electrical driving of a body that is reciprocally displaceable over a limited length in a straight or curved line and provided with a magnet or a magnetizable counter-element. The stator is provided here with an elongate holder to which are attached a number of mutually parallel and adjacent carrier elements fixed transversely onto the holder and a number of windings. These windings are connected to a controlled voltage source with which a field strength is generated which is such that the door can be displaced by alternating actuation of these windings. Each winding is here trained in each case round two carriers, whereby two separately powered windings overlap one another. This requires a relatively complex process for the purpose of arranging the connected windings.

A problem with this and other know stator elements usable for a sliding door is having to provide considerable field strength to enable the displacement of such a door.

The present invention has for its object to provide a stator element wherein a sufficient strength of the electromagnetic field is realized in an efficient manner.

This object is achieved with the stator element according to the present invention, comprising:
  an elongate holder;
  a number of carrier elements arranged adjacently of each other and connected to the holder, wherein the carrier element comprises a number of plate-like strips;
  at least one winding arranged round each carrier element, wherein during use the winding is connected to a voltage source for the purpose of generating an electromagnetic field which during use is operatively connected to at least one counter-element in the form of a magnet or magnetizable element provided on the slidable body.

The stator element is provided with an elongate holder which serves as a kind of housing in which a number of carrier elements arranged adjacently of each other are provided. At least one winding is arranged round each of these carrier elements. An electromagnetic field can be generated by connecting the winding to a voltage source. By alternately actuating or leaving these windings voltage-free over time a field is obtained with a strength which varies in time in longitudinal direction of the elongate holder. By providing the elongate holder in a direction parallel to the upper edge of the slidable body, such as a door, gate or carriage, it is possible to displace such a slidable body in this direction. Counter-elements are provided for this purpose on the upper part, in particular close to the upper edge, of the slidable body. These counter-elements are manufactured from magnets or magnetizable material. Use can be made here of, among others, ferrite, samarium-cobalt alloy or neodymium-iron alloy, and also other alloys of lanthanides, cobalt and/or iron. The carrier elements are provided here with a number of strips. Surprisingly, the field can be better directed by making use of carrier elements constructed from a number of strips. It is hereby possible to suffice with a relatively smaller overall field strength. This means that use can be made of fewer and/or lighter materials, and/or that it is possible to suffice with lower power. An additional advantage of the use of strips is realized in that the carrier element comprises a number of plate-like strips so that for instance the width of such a carrier element, i.e. preferably in transverse direction of the elongate holder, can be adapted in simple manner to the specific conditions of a case. These conditions are, among others, the size of the body to be displaced, the space in for instance a frame around the body to be displaced, and so on. The individual carrier elements are preferably actuated in groups. Three individual groups can for instance thus be envisaged. It is thus possible for instance to provide three groups, wherein a first carrier element belongs to group 1, the immediately adjacent second carrier element belongs to group 2, the carrier element immediately adjacent to the second belongs to group 3, and the carrier element immediately adjacent thereto once again belongs to group 1, and so on. The successive actuation of groups 1, 2 and 3 realizes that the slidable body will actually begin to displace relative to the elongate holder. The slidable body can be displaced in the opposite direction by changing the sequence of actuation of the individual groups. If a slidable body is for instance displaced to the left by the successive actuation of groups 1, 2 and 3, the slidable body will conversely be displaced to the right by successive actuation of groups 3, 2 and 1. A fully automatic slidable system can hereby be realized. A possible housing for the stator element is provided of aluminium. The generated magnetic fields are better shielded by providing the elongate holder and the carrier elements of the stator element with an aluminium housing. The result is a comparatively stronger magnetic field, whereby it is for instance possible to suffice with less material and/or fewer components for the purpose of displacing a body. Such a housing can also be provided with suspension brackets for connecting the stator element to a fixed construction, such as for instance a wall of a building. The stator element is preferably connected operatively to a control unit. The magnetic fields can hereby be generated in semiautomatic and/or automatic manner, and optionally remotely. The control unit can here be placed physically in or close to the stator element. It is however also a possibility to place the control unit remotely from the stator element. The overall space required for the stator element is further limited here. In a preferred embodiment according to the present invention the voltage source comprises a 24 V low-voltage source. By making use of a 24 V low-voltage source a magnetic field can be generated in a relatively simple manner without making use of higher voltages. This results in safe use of a stator element according to the invention.

In a preferred embodiment according to the present invention the strips of a carrier element are insulated from each other.

Stray currents are prevented by mutual insulation of the strips of a carrier element. This means that due to the mutual insulation of the strips the strength of the electromagnetic field is increased through being better directed in the desired longitudinal direction. Such an insulation is preferably provided as a film material, a plastic. This film material is therefore situated between preferably each individual strip. This insulating film can here advantageously already be provided on the metal of the strip, for instance by adhesion, before these strips are assembled in the correct form. These strips preferably have a length of about 6 cm and a height of about 3 cm. In an advantageous embodiment the whole strip package has a thickness of about 3 cm, wherein for instance 20 strips together form one carrier element.

In an advantageous preferred embodiment according to the present invention the carrier elements are oriented in longitudinal direction of the stator element.

Owing to the orientation of the carrier elements in longitudinal direction the mutual distances between the sides of the carrier elements directed toward the slidable body can remain relatively close together. For this purpose the carrier element has a kind of T-shape. The horizontal part of this T-shape for the carrier element, or the shoe, lies in the longitudinal direction of the elongate holder, and therefore also in the longitudinal direction of the slidable body. The vertical part of the T-shape is the part around which the winding or windings are provided.

In an advantageous preferred embodiment according to the present invention the ratio of carrier elements to counter-elements in the longitudinal direction of the stator element differs from 1.

Owing to the different ratio of carrier elements to counter-elements on the slidable body per linear unit of length in longitudinal direction of the stator element, and thereby of the slidable body, a better controllability of the slidable body along the stator element is realized. In an advantageous embodiment there are three carrier elements, or three shoes, per 20 cm of the linear length of the stator element. Two or four counter-elements may then be present along this same distance. This means that said ratio can be smaller than 1 or greater than 1. An overlap between the adjacent surfaces or sides of a carrier element is hereby realized in the form of a horizontal part of the T-shape thereof and the side of the counter-element directed toward the carrier element. This overlap enables a relatively smooth transition from a first state, in which a first winding is actuated, to a second subsequent state in which another adjacent winding is actuated. As a result of this other actuated group or winding the slidable body will in principle be displaced in the direction of the changing actuation of windings. By actuating the windings in the correct sequence the slidable body can perform a relatively smooth movement, for instance from open to closed or vice versa. Braking of a slidable body which is in motion can for instance be performed by reversing the current through the windings. That is, the sequence of actuated windings is precisely in opposite direction to the movement of the slidable body. A braking force is hereby exerted on this body, whereby the movement will cease.

In a preferred embodiment the carrier elements are divided over three groups, wherein these groups lie alternately in longitudinal direction of the elongate holder. This means that three adjacent carrier elements are divided over three individual groups. The three individual groups are actuated successively in order to bring about a movement of the slidable body. In a further advantageous preferred embodiment according to the present invention the counter-elements alternately comprise permanent magnets with a north pole and a south pole.

Providing permanent magnets makes it possible to for instance support a slidable body even in a situation where no current is present. In a possible embodiment the stator element is here provided on the top side of the slidable body and the permanent magnets are placed on or close to the upper edge of the slidable body. The slidable body will more or less continue to float due to the effect of the permanent magnetic field. Such a floating door has the additional advantage that it can be displaced in relatively simple manner, optionally also manually. The effect of the field is further enhanced by providing alternating north and south poles. It is therefore possible to suffice with less material and/or lower voltages.

In a further advantageous preferred embodiment according to the present invention a detection means is provided for the purpose of determining the direction and/or speed of displacement of the slidable body.

By providing a detection means it is possible to detect the direction of displacement of the slidable body. The speed of the bodies can optionally also be determined herewith. Such signals can be used for a control of the whole construction with the stator element in order to thereby obtain a better control. A possible detection means is provided in the form of a so-called hall sensor. It is further possible to provide a closure indicator for the slidable body. This can provide for instance a fire prevention system with information. The closure indicator can also be used as calibration for the control. It is thus possible for instance in the case of a closure indication to reset in the control unit the location of the door according to the software. This prevents the control being out of step with the actual position of the slidable body. In addition, the stator element is provided in an advantageous preferred embodiment with a safety means for the purpose of responding to a blockage of the slidable body. Such a blockage can for instance occur when something or someone is situated in the opening of the slidable body, for instance a door opening. In a possible embodiment this safety means is embodied in the form of a control which, if it is detected that a displacement of the slidable body is failing to occur, attempts only a single adjustable time to slide the body further, after which an alarm is for instance generated. This avoids damage to the slidable body and to the blockage in the form of something or someone.

In a further advantageous preferred embodiment according to the present invention an opening is provided in the adjacently arranged carrier elements for passage of a guide.

By omitting at least one of the carrier elements in the elongate holder an opening is realized in transverse direction thereof. Such an opening can for instance be used for passage of a guide track in a direction substantially transversely of the longitudinal direction of the elongate holder. In the case of residential care homes a lifting aid can for instance hereby be used in the transport of goods or persons from the one space to the other through a door opening. The guide track of the lifting aid here passes through the stator element. The guide track can here pass through without interruption, whereby in this case the lifting aid is not obstructed by the slidable body in the form of a door.

The invention further relates to a sliding door provided with a stator element as described above. Such a sliding door provides the same effects and advantages as those stated in respect of the stator element.

The invention also relates to a method for sliding a slidable body while making use of a stator element as described above. The method here provides the same effects and advantages as those stated in respect of the stator element.

Further advantages, features and details of the invention will be elucidated on the basis of preferred embodiments thereof, wherein reference is made to the accompanying drawings, in which:

FIG. 5 shows a cross-section of the sliding door of FIG. 1; and

FIG. 6 is a top view of the sliding door of FIG. 1.

Figure 1:
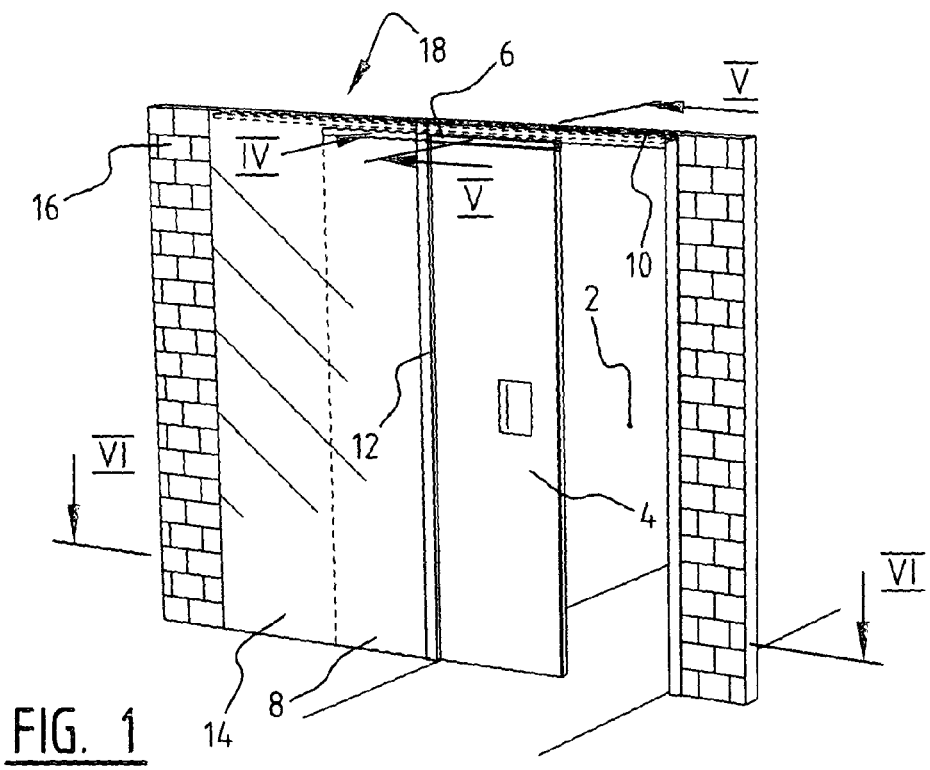
FIG. 1 shows a view of a sliding door according to the invention.

A passage 2 (FIG. 1) can be opened or closed with a sliding door element 4 which has an upper edge 6 and a lower edge 8. The sliding door element 4 moves along side posts 12 connected to the fixed wall. In the opened position the sliding door element 4 is situated along a wall or preferably in a cavity or recess 14. Situated in wall 16 above sliding door 4 is the stator element 18 which controls the displacement of door 4.

A stator element 18 (FIG. 2) is provided with a number of carriers 20. A carrier or shoe 20 consists of a transverse part 22 of a T-piece. The leg with the windings or coil 24 therearound connects transverse part 22 to carrier part 26. Plastic protective parts 28 are placed on these carrier parts 26. Corner protectors 30 of plastic are provided close to the transition between the leg with windings 24 and the transverse part 22. The upper surface of T-piece 22 is provided with a recess 32 for the purpose of guiding a floating door 4.

Figure 3:
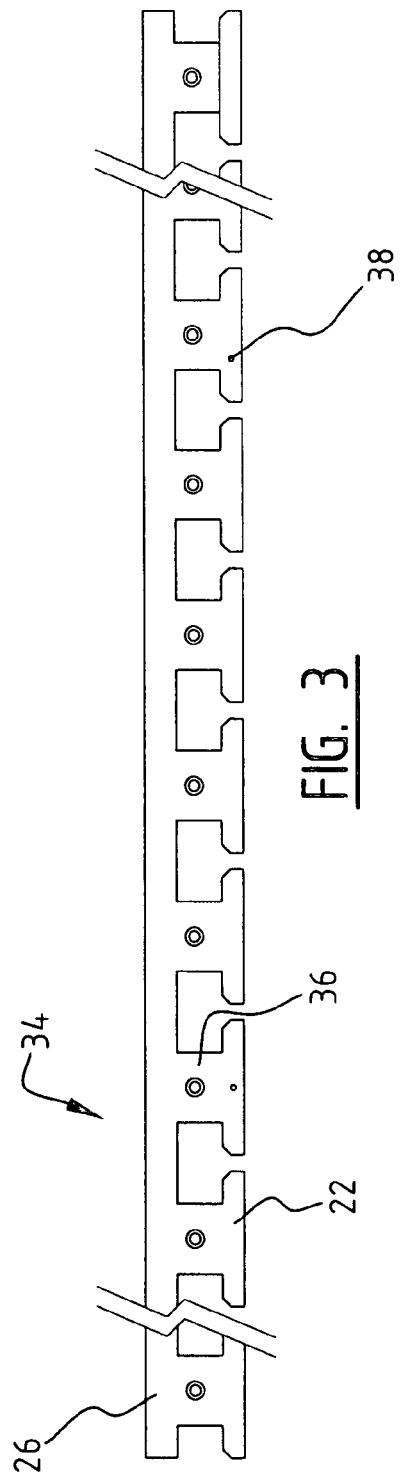
FIG. 3 is a side view of a strip of FIG. 2.

Stator element 18 is constructed from a number of strips 34 (FIG. 3). The thickness of such a strip 34 amounts to about 1.5 mm. A stator element consists for instance of thirty carrier elements 20 (shown partially in FIG. 3). A single strip part 34 is for instance punched from a sheet of material. The strip is provided here with a film for the mutual insulation of strips 34. Carrier elements 20 are mutually connected via support part 26 to which the middle part 36 of each carrier element 20 is connected. The windings or coil 24 are provided around middle part 36. In transverse part 22 of carrier element 20 there is provided in a number of these carrier elements 20 a spacer 38 with which stator element 18 can be held at the desired position.

Figure 4:
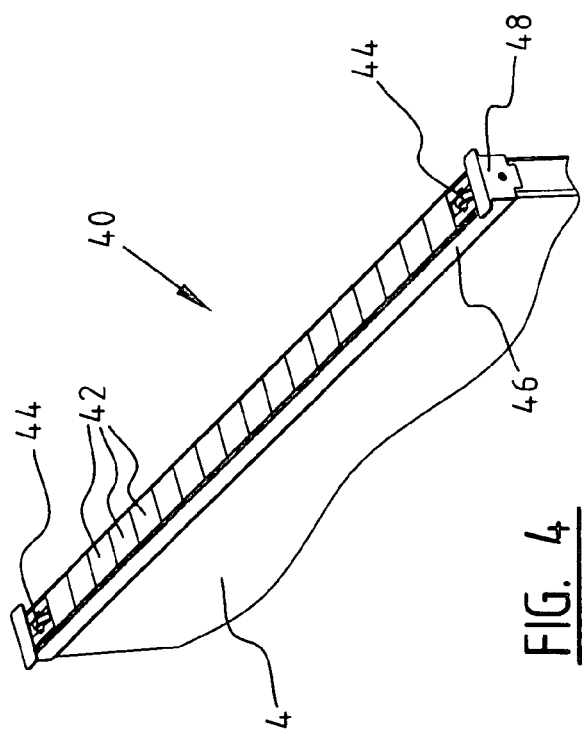
FIG. 4 is a view of an upper edge of the sliding door of FIG. 1.

Stator element 18 interacts with sliding door 4 (FIG. 4). Magnets 42 are placed on upper edge 40. In the preferred embodiment a number of wheels 44, which provide for guiding of the sliding door element 4, are placed at the outer ends of upper edge 40. Magnets 42 are placed in a U-profile 46 which holds these magnets. A ferromagnetic member (not shown) embodied as a metal strip can be arranged under the magnets for the purpose of strengthening the magnetic field. The U-profile is closed at the outer ends with an end guard 48 which also functions as means for limiting the drop height on the top side of the door.

Figure 2:
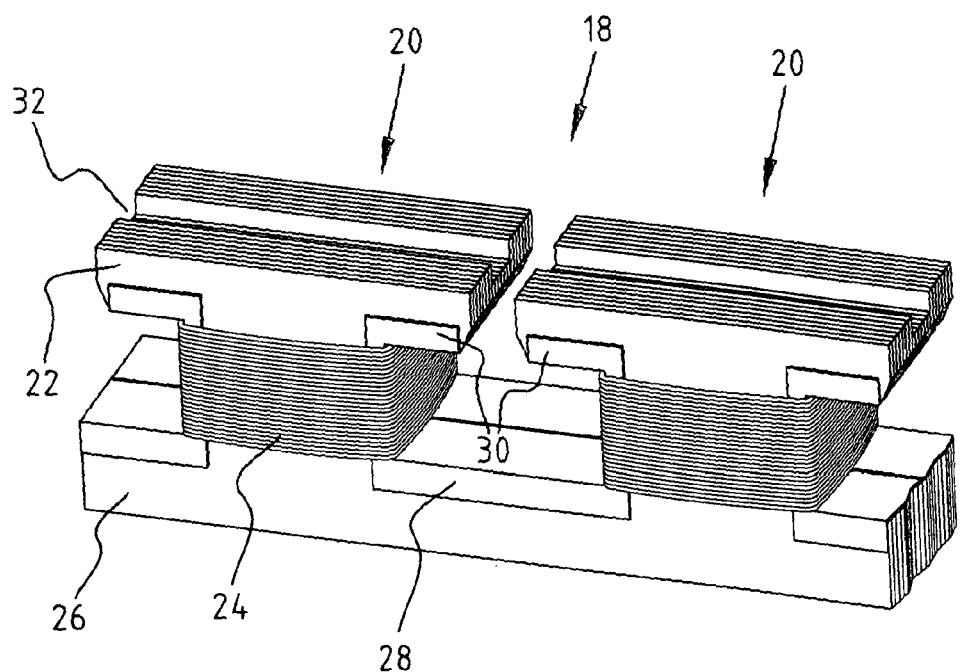
FIG. 2 shows a view of a stator element according to the invention.

A sliding door 4 floats some distance from ground surface 50 (FIG. 5). Floating door 4 is guided on the underside by a door guide 52 (the door guide 52 being a safety means). This prevents, among other things, floating door 4 being able to move too far out of the door plane. At the top floating door 4 is provided with a guide 54. Guide 54 is provided with a number of wheels 44. These wheels 44 run over a running surface 56 arranged on housing (elongate holder) 58 of stator element 18. Stator element 18 can be accommodated wholly or partially in wall 16. A recess in wall 16 is provided for this purpose with an adjusting lath 60 connected to an upper edge 61 (upper edge 61 anchoring suspension bracket 78). A finishing trim 62 is placed close to the transition between wall 16 and door 4. For the sake of clarity the stator element with the components as shown in FIGS. 2 and 3 is not included in housing 58 as shown in FIG. 5. Wall 16 can be finished with finishing strips or for instance 12.5 mm plasterboard 64.

In the opened position door 4 is received in a cavity or recess 66 of wall 16 (FIG. 4). Where door 4 comes close to wall 16 trims 68 are provided for finishing and possible guiding of door 4. In the opened and closed position a side edge of door 4 comes close to an end post 70 protecting or safeguarding against possible overrunning of door 4 (the end post 70 being a safety means). Filler strips or adjusting laths 72 resting against wall 16 are situated between these end posts 70. The door opening is provided with a number of trims or posts.

The shown embodiment has a specified passage or clear width. The overall width of sliding door 4 is therefore preferably twice this clear width plus about 15-20 cm. The width of trims 74 and 62 amounts to for instance 50 mm. In the case the thickness of wall 16 amounts to about 100 mm, a width of cavity 66 can be realized of about 75 mm. A control box 76 (including the closure indicator and detection means) can for instance be accommodated in wall 16.

The present invention is not limited to the above described preferred embodiments thereof. The rights sought are defined by the following claims, within the scope of which many modifications can be envisaged.

The invention claimed is:

1. A stator element for an electrical driving of a slidable body, the stator element comprising:
    an elongate holder with a longitudinal length;
    a plurality of carrier elements arranged within the holder, the plurality of carrier elements arranged adjacently to each other along the longitudinal length of the holder, the carrier elements being mutually connected by a horizontally-oriented support part,
        each carrier element including a vertically-oriented middle part extending from the support part,
        each of the carrier elements including a horizontally-oriented transverse part on a distal end of the middle part, each of the transverse parts defining a recess, the recesses collectively forming a passage for a guide, the passage existing in a plane that is along the longitudinal length of the holder,
        the support part, the middle parts, and the transverse part being mutually formed from a plurality of planar strips;
    at least one winding arranged around the middle part of each carrier element, the winding being configured to connect to a voltage source to generate an electromagnetic field which produces a driving force acting on at least one counter-element on the slidable body, the counter-element being magnetized.

2. The stator element of claim 1, wherein the strips of the carrier elements are insulated from each other.

3. The stator element of claim 1, wherein the stator element is provided with suspension brackets for connecting the stator element to a fixed construction, the fixed construction being a building.

4. The stator element of claim 1, wherein the ratio of carrier elements to counter-elements in the longitudinal direction of the stator element differs from 1.

5. The stator element of claim 1, wherein the counter-elements alternately comprise permanent magnets with a north pole and south pole configuration.

6. The stator element of claim 1, wherein a detection structure is provided for the purpose of determining at least one of a direction and a speed of displacement of the slidable body.

7. The stator element of claim 1, wherein a closure indicator is provided for the slidable body.

8. The stator element of claim 1, wherein a safety structure is provided to prevent movement of the slidable body in the event of a blockage of the slidable body.

9. The stator element of claim 1, wherein an opening is provided in the adjacently arranged carrier elements for passage of a guide.

10. A sliding door provided with the stator element of claim 1.

11. The sliding door of claim 10, wherein at least an upper edge of the door is provided with one or more wheels for guiding the sliding door.

12. Method for sliding the slidable body using the stator element of claim 1 by activating the voltage source to generate the electric, field which produces the driving force on the at least one counter element.

13. The stator element of claim 2, wherein the stator element is provided with suspension brackets for connecting the stator element to a fixed construction, the fixed construction being a building.

14. The stator element of claim 1, wherein each of the carrier elements has a T-shaped profile, with a longitudinal length of each of the transverse parts being substantially parallel to the longitudinal length of the elongate holder.

15. The stator element of claim 1, further comprising:
the elongate holder being configured to shield the generated magnetic field.

* * * * *